Figure 1:
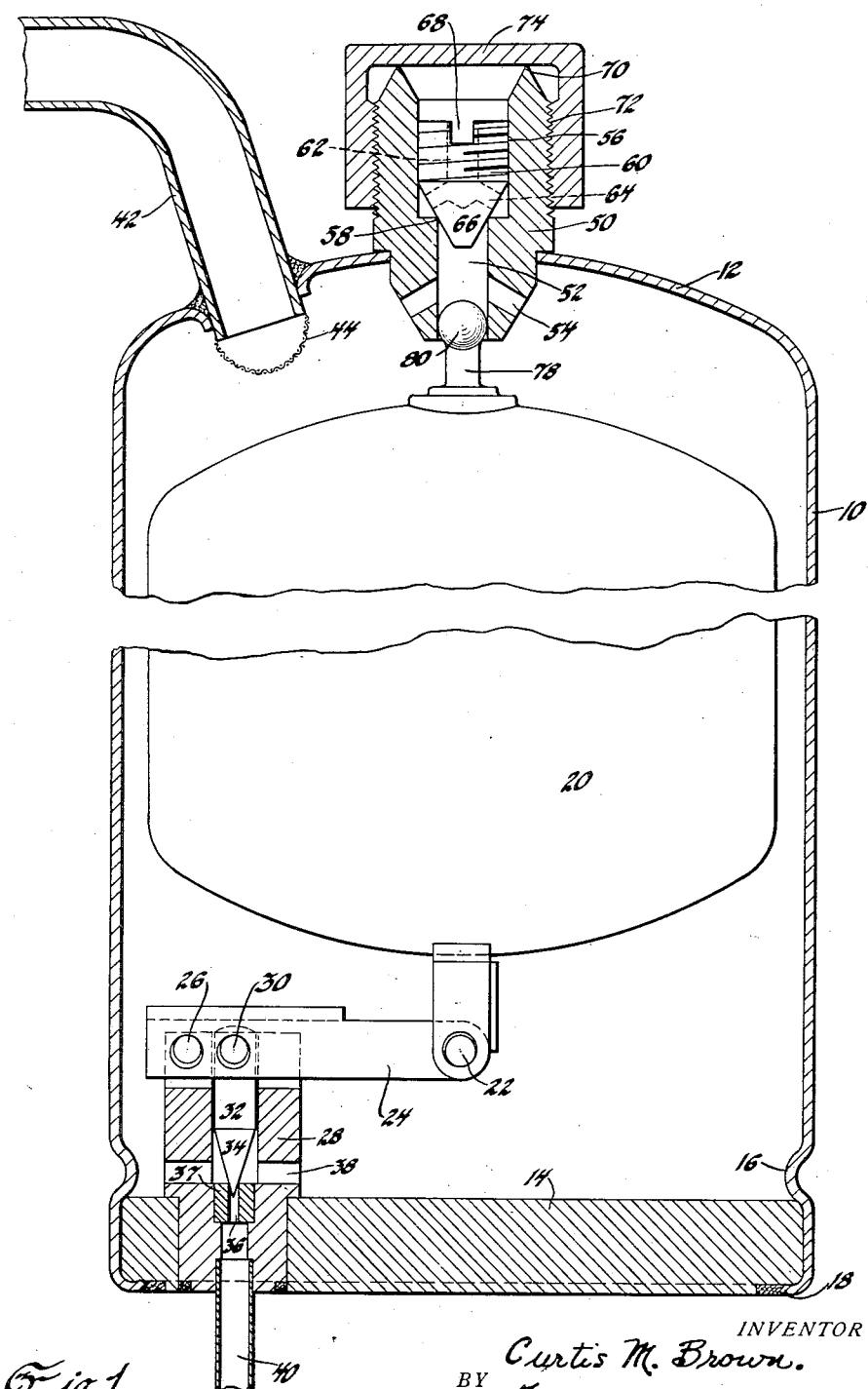

July 17, 1934.   C. M. BROWN   1,966,706
VENT SEALING MEANS
Filed March 2, 1931

INVENTOR
Curtis M. Brown.
BY Francis D. Hardesty
ATTORNEY

Patented July 17, 1934

1,966,706

UNITED STATES PATENT OFFICE 1,966,706

VENT SEALING MEANS

Curtis M. Brown, Greenville, Mich., assignor to Gibson Refrigerator Company, Greenville, Mich., a corporation of Michigan Application March 2, 1931, Serial No. 519,395

1 Claim. (Cl. 220—44)

This invention relates to float valves and more particularly to float valves particularly adapted to be used with refrigerators.

An object of this invention is a float valve including a casing and a float therein, the casing having the ordinary inlet and outlet and having an auxiliary inlet controlled by a manual valve which permits an auxiliary supply of liquid or other fluid to be introduced into the casing and thereby into the refrigerator line.

A further object is a float valve such as is described above wherein the auxiliary inlet valve is formed to provide guide means for the float in the casing.

Still further objects will readily occur to those skilled in the art upon reference to the following description and the accompanying drawing in which The single figure on the drawing shows the float valve in section.

Referring to the drawing, it will be seen that the float valve includes a casing 10 closed by an upper head end 12 integral with the side wall of the casing and having a bottom 14 held in by and disposed between the clamps 16 and the inturned end 18 of the casing side wall. Disposed within the casing is a float 20 pivotally connected at 22 to a lever 24 which is pivotally mounted at 26 on the block 28 forming a part of the float valve bottom 14. Pivotally mounted to the lever 24 at the point 30 is a valve stem 32 having a needle point plug valve 34 adapted to close the port 36 in the plug 37 which provides communication, thru the lateral passages 38, between the interior of the casing 10 and the outlet tube 40. The main inlet for the float valve is thru the tube 42 whose end is covered by a mesh screen 44.

Disposed within the head 12 is an auxiliary valve which forms an important part of the invention. The auxiliary valve includes a sleeve 50 welded, soldered or otherwise sealed and secured to the end 12, and having therein a bore 52 which is provided with lateral passages 54 connecting the bore with the interior of the casing.

The sleeve is further provided with an internally threaded counterbore 56 which forms at 58, an annular valve seat. Threaded into the counterbore 56 is a plug 60 having a bore 62 and lateral passages 64 connected thereto and opening to the tapered plug valve end 66 of the plug. The upper end of the plug is provided with a slot 68 adapted to receive a screw driver so that the plug may be moved in or out of the bore to engage or relieve itself of the seat 58 so as to close or open the sleeve bore 52, as desired.

The upper end of the sleeve is formed with a sharp, annular edge 70 and on the outside of the sleeve there is a thread 72 by means of which a cap 74 may be threaded onto the sleeve and close the latter, so as to conceal the plug valve 60 and the bore 62, the head of the cap 74 engaging the sharp ring 70 to form an auxiliary seal.

It will be seen that when it is desired to introduce an auxiliary supply of fluid into the casing 10 the operator can remove the cap 74 and then can rotate the plug 60 a few turns so as to relieve the valve seat 58. He can then introduce the fluid into the sleeve, the tapered ring 70 forming a funnel, and the fluid will then go thru the plug bore 62, thru the lateral passages 64, and then into the bore 52 and out the lateral passages 54 into the casing.

The auxiliary valve also serves as a guide for the float 20, the latter being provided with an upwardly extending element 78 having a ball head 80 disposed within the bore 52. It will be seen that as the float rises or falls with the level of the liquid, the element 78 and head 80 will ride in the bore 52 and will cause the float to be guided in its movement.

Now having described the invention and the preferred embodiment thereof, it is to be understood that the said invention is to be limited, not to the specific details herein set forth, but only by the scope of the claim which follows.

What I claim is:

A receptacle closure and filling device comprising a sleeve secured to the receptacle wall, the sleeve having a bore and a counterbore, a plug in said counterbore engaging the inner wall of the sleeve on the annular edge at the upper end of the bore to close the latter, the plug having a reduced end partially entering said bore and a bore having lateral passages opening to said reduced end above the sleeve bore, and a cap on said sleeve, the upper end of the sleeve being outwardly flared and tapered to form a valve element adapted to coact with the cap to seal the upper end of the sleeve.

CURTIS M. BROWN.